US009178789B2

(12) United States Patent
Zhang et al.

(10) Patent No.: US 9,178,789 B2
(45) Date of Patent: Nov. 3, 2015

(54) SYSTEM AND METHOD FOR TRANSMISSION CONTROL PROTOCOL SLOW-START

(75) Inventors: Yan Zhang, Harrison, NJ (US); Nirwan Ansari, Montville, NJ (US); Mingquan Wu, Princeton Junction, NJ (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 470 days.

(21) Appl. No.: 13/340,354

(22) Filed: Dec. 29, 2011

(65) Prior Publication Data

US 2013/0044598 A1 Feb. 21, 2013

Related U.S. Application Data

(60) Provisional application No. 61/525,480, filed on Aug. 19, 2011.

(51) Int. Cl.
*G01R 31/08* (2006.01)
*H04L 12/26* (2006.01)
*H04L 12/807* (2013.01)
*H04L 12/801* (2013.01)
*H04L 12/841* (2013.01)

(52) U.S. Cl.
CPC ............ *H04L 43/0882* (2013.01); *H04L 47/27* (2013.01); *H04L 47/29* (2013.01); *H04L 43/16* (2013.01); *H04L 47/193* (2013.01); *H04L 47/283* (2013.01)

(58) Field of Classification Search
CPC combination set(s) only.
See application file for complete search history.

(56) References Cited

U.S. PATENT DOCUMENTS

| 2002/0085587 A1* | 7/2002 | Mascolo | 370/477 |
| 2005/0018617 A1* | 1/2005 | Jin et al. | 370/252 |
| 2005/0083850 A1* | 4/2005 | Sin et al. | 370/252 |
| 2007/0165524 A1* | 7/2007 | Mascolo | 370/230 |
| 2008/0181109 A1* | 7/2008 | Igarashi et al. | 370/231 |

OTHER PUBLICATIONS

Man, C., et al., "An Inline Measurement Method of Capacity of End-to-end Network Path," Workshop on End-to-End Monitoring Techniques and Services, May 15, 2005, 16 pages, IEEE.
"ImTCP's Homepage," Nov. 3, 2011, 3 pages. http://www.ane.cmc.osaka-u.ac.jp/~hasegawa/imtcp/
Man, C., et al., "Inline Measurement Method of the Physical Bandwidth of the Network Path Between End Hosts," Jun. 16, 2006, 3 pages.

(Continued)

*Primary Examiner* — Jung-Jen Liu
(74) *Attorney, Agent, or Firm* — Slater & Matsil, L.L.P.

(57) ABSTRACT

An embodiment of a system and method that uses inline measurements to probe available bandwidth for a transmission control protocol, and adaptively sets a slow-start threshold according to the available bandwidth. The method includes initializing a congestion window "cwnd," sending cwnd packets, estimating an available bandwidth for the cwnd packets. The congestion window cwnd is set to a higher number, and the higher number of further packets is sent if the available bandwidth is greater than a first threshold level. The available bandwidth is re-estimated for the higher number of the further packets, and a soft start threshold "ssthresh" is set to the re-estimated available bandwidth. A statistical measure is calculated for the re-estimated available bandwidth, and the congestion window cwnd is set equal to ssthresh if a ratio of the statistical measure to the re-estimated available bandwidth is less than a second threshold level.

22 Claims, 4 Drawing Sheets

(56) References Cited

OTHER PUBLICATIONS

"TCP Congestion Control Exercise (Solutions)," Nov. 8, 2011, 1 page. http://www.cs.newpaltz.edu/~easwaran/CCN/Week9/tcpCongestionExercises_Solutions.html Tsugawa, T., et al. "Implementation and evaluation of an inline network measurement algorithm and its application to TCP-based service," ppt. presentation from E2EMON Workshop, Apr. 3, 2006, 3 pages.

* cited by examiner

SYSTEM AND METHOD FOR TRANSMISSION CONTROL PROTOCOL SLOW-START

This application claims the benefit of U.S. Provisional Application No. 61/525,480, filed on Aug. 19, 2011, entitled "System and Method for Transmission Control Protocol Slow-Start," which application is hereby incorporated herein by reference.

TECHNICAL FIELD

The present invention generally relates to transmission control protocol in wide area networks; and more specifically, transmission control protocol slow-start in wide area networks.

BACKGROUND

Information technology ("IT") organizations often employ a Wide Area Network ("WAN") to, inter alia, deploy their processing infrastructures over a broad geographical area to increase productivity, support global collaboration, and minimize costs. Traditional local area network ("LAN")-oriented infrastructures are generally insufficient to support global collaboration with high application performance and low costs. Deploying applications over WANs inevitably incurs performance degradation owing to the intrinsic nature of WANs, including such issues as operation over long distances, high latency, and high packet loss rate.

Transmission Control Protocol ("TCP") is the software process that provides a communication service between an application program and the IP. Although TCP is the de facto standard for Internet-based commercial communication networks, it performs poorly under conditions of moderate to high packet loss and end-to-end latency. For instance, TCP generally exhibits substantial transmission inefficiencies during the "slow-start" phase.

More specifically, slow-start is used in conjunction with other algorithms to avoid sending more data than the network is capable of transmitting, that is, to avoid causing network congestion. It is also known as the exponential growth phase. During the exponential growth phase, slow-start works by increasing the TCP congestion window each time the acknowledgment is received, i.e., it increases the window size by the number of segments acknowledged. This happens until either an acknowledgment is not received for some segment or a predetermined threshold value is reached. If a loss event occurs, TCP assumes that it is due to network congestion and takes steps to reduce the offered load on the network. Once a loss event has occurred or the threshold has been reached, TCP enters the linear growth (congestion avoidance) phase. At this point, the window is increased by 1 segment for each RTT. This also happens until a loss event occurs.

Although the strategy is referred to as "slow-start", its congestion window growth is quite aggressive. Nevertheless, the performance of the TCP slow-start phase generally degrades under conditions of long communication distances and high end-to-end latency, which generally are inherent characteristics of WANs. Accordingly, there exists a need to provide more efficient operation of TCP, especially during the slow-start phase.

SUMMARY OF THE INVENTION

The above-identified deficiencies and drawback of the slow-start phase of TCP is overcome through example embodiments of the present invention. For example, embodiments described herein provide for incorporating an inline available bandwidth probing mechanism into the TCP slow-start phase. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Example embodiments described herein generally provide systems, methods, apparatus, and computer program products for TCP communication service to incorporate inline available bandwidth probing into the TCP slow-start phase. More specifically, in accordance with one example embodiment, a TCP slow-start threshold value is adaptively and smoothly set. For example, furthermore, one embodiment is an inline measurement to adaptively adjust a congestion window during the slow-start phase to allow it to reach a slow-start threshold quickly and smoothly. By incorporating inline available bandwidth probing into the TCP slow-start phase, the TCP congestion window is quickly ramped up during the slow-start phase, and the TCP slow-start threshold is adaptively and smoothly set.

As seen, the above embodiments advantageously provide for increased efficiencies by minimizing the start time and smoothing the transition, which includes many added benefits such as improved utilization of bandwidth between a sender and receiver.

Still other example embodiments provide systems and methods and apparatus to operate a slow-start phase of a transmission control protocol system. For example, an embodiment provide a method comprising initializing of a congestion window, sending congestion window packets, estimating an available bandwidth for the congestion window packets. Note, embodiments provide that the congestion window is set to a higher number, and a number of further packets are sent corresponding to the higher number if the available bandwidth is greater than a first threshold level. In another embodiment, the available bandwidth is re-estimated for the higher number of the further packets. Further, a slow-start threshold is set to the re-estimated available bandwidth to control termination of the slow-start phase. In yet another embodiment, delay dispersion of acknowledgment packets sent back from a receiver is employed for estimating an available bandwidth.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understand that these drawings depict only typical embodiments of the invention; and are not, therefore, to be considered limiting of its scope. For a more complete understanding of the present invention, and the advan

DETAILED DESCRIPTION OF ILLUSTRATIVE EMBODIMENTS

Figure 1:
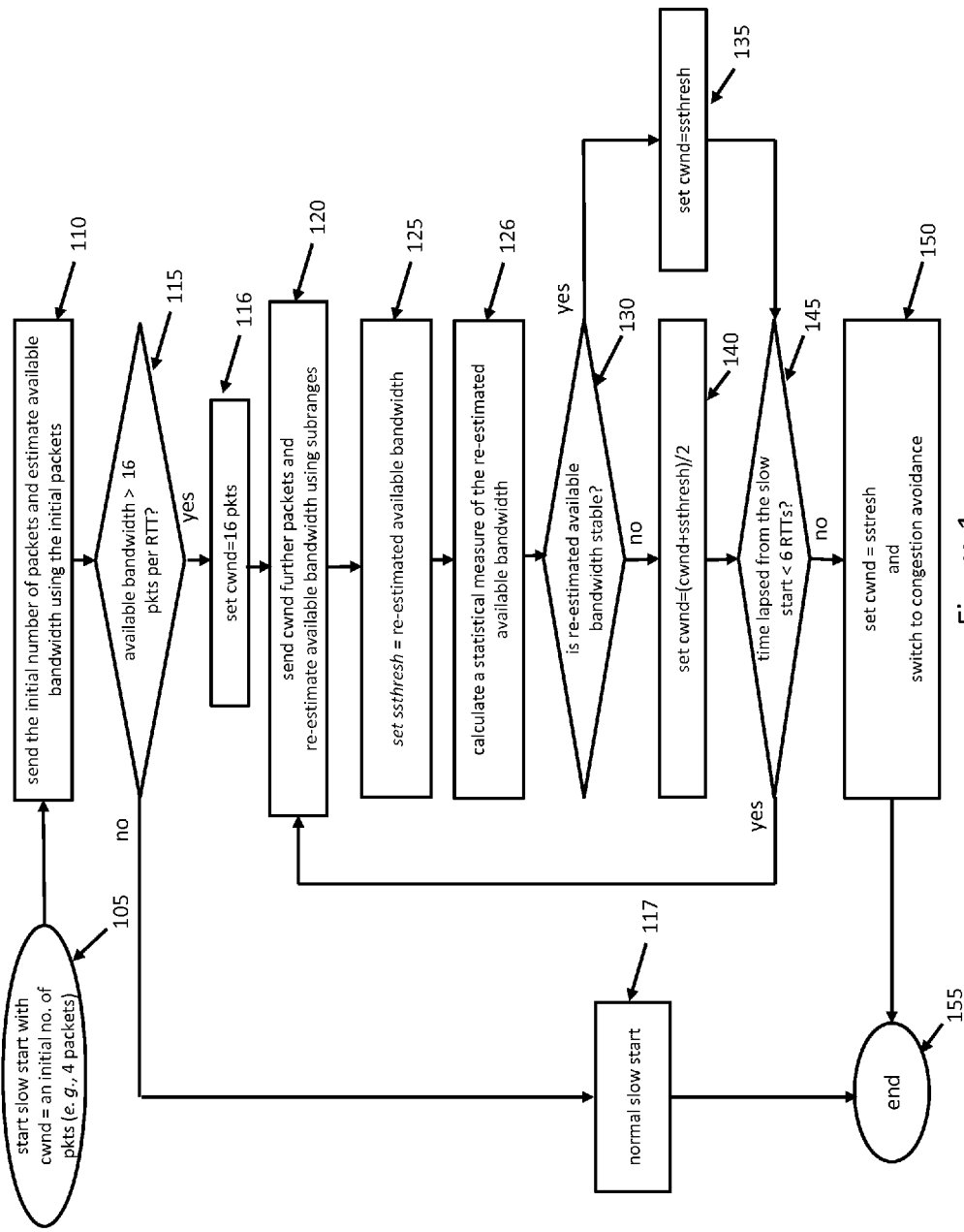
- FIG. 1 illustrates an example flow chart of the adaptive fast start process for TCP, in accordance with an example embodiment described herein.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

TCP is a software process that provides a communication service between an application program and the IP. To provide congestion control for the network which provides a limited-bandwidth communication path between a sender and a receiver, TCP uses a number of flow-control mechanisms to avoid congestion collapse of the intervening network. When the network becomes overloaded, its performance can fall by several orders of magnitude. Thus, mechanisms are employed to control the rate of data entering the network, keeping the data flow below a rate that would trigger network collapse.

To implement a strategy to control transmitted data, the sender initially sends a conservative number of packets, and gradually increases the number of packets sent with a sliding congestion window (herein termed "cwnd") to control the amount of data sent as the sender evaluates performance of the communication path to the receiver. Generally speaking the congestion window sets the number of packets sent during one round trip time interval.

At some point the capacity of the intervening communication path is reached, and an intermediate router or some other process will start to discard packets. This tells the sender that its congestion window has gotten too large.

TCP performance generally suffers from the TCP slow-start mechanism in high-speed, long-delay networks. In standard a "slow-start" process, TCP at the sender starts with a congestion window size of one segment (about 4 kB). TCP then exponentially increases the congestion window size, substantially doubling every round-trip time ("RTT") until it reaches a slow-start threshold (termed herein "ssthresh"). The slow-start phase is sometimes referred to as the "exponential growth" phase of the TCP connection. The slow-start threshold (e.g., ssthresh), is a parameter that is initialized by TCP to a maximum window size, or in some implementations, to a random value between zero and a maximum window size. The slow-start threshold ssthresh determines when the slow-start phase ends and a congestion-avoidance phase, which is a linear growth phase for the congestion window, takes over. In Wide Area Networks (WANs), the RTT is generally tens and even hundreds of milliseconds.

Various rules are employed by TCP to control the slow-start threshold and the congestion window. In the slow-start phase, TCP operates by increasing the TCP congestion window (e.g. cwnd) by one segment each time an acknowledgment is received. In the congestion-avoidance phase, the congestion window is linearly increased by one segment for each RTT, which continues until a data-loss event occurs. When a data loss is detected due to a timeout, the congestion window cwnd is reset to one. Thus, a substantial reduction in capacity of the connection occurs due to a timeout. When a packet loss is detected, the slow-start threshold is set to half the value of the congestion window and the slow-start phase begins again from the initial value of.

At the beginning of a connection, TCP attempts to probe the available bandwidth while application data is waiting to be transmitted. Therefore, the TCP slow-start phase increases the number of round trips and delays for the entire application; thus, resulting in inefficient network capacity utilization. Furthermore, the TCP congestion window is initially set to a small value, during the slow-start phase, and thus TCP cannot use the available bandwidth efficiently.

In accordance with an embodiment, the congestion window may be ramped up very quickly and smoothly, thereby increasing throughput for TCP during the slow-start phase. The TCP slow-start phase is enhanced by setting the slow-start threshold (e.g. ssthresh) more carefully, while simultaneously adjusting the congestion window (e.g. cwnd) more carefully. Being the switching point between slow-start and congestion avoidance, the slow-start threshold appears critical to TCP performance. For instance, if slow-start threshold is set too low, TCP switches from the exponential growth slow-start phase to the linear growth congestion avoidance phase prematurely, which may cause TCP to experience an unnecessarily long time to reach a proper window size. On the other hand, a high value for slow-start threshold may lead to multiple packet losses and, more seriously, may cause TCP timeouts. Applicants discovered that bandwidth-delay product ("BDP") calculated from the available bandwidth provides a good estimate for slow-start threshold. Therefore, it would be beneficial for TCP to provide a way to measure the available bandwidth and set slow-start threshold intelligently.

Also note that at the beginning of a transmission, the exponential increase of the congestion window size is important to increase bandwidth utilization quickly. Exponential increase of the congestion window, however, is too aggressive as the connection nears its equilibrium point, often leading to a large number of packet losses within one RTT, and more seriously, potentially causing TCP timeouts. In order to shorten the interval of time that TCP increases the congestion window from its initial value to slow-start threshold quickly at the beginning and smoothly when it nears slow-start threshold, the TCP slow-start phase is modified in an embodiment to provide an efficient method to adjust the congestion window (cwnd) as it approaches the value of (ssthresh). It has been observed that traffic during the slow-start phase can be very bursty and can far exceed the BDP of the network path. This serious overshoot may put a heavy load on router queues and produce higher queuing delays, more packet losses, and lower throughput. TCP pacing can be used to smooth the behavior of TCP traffic by evenly spacing, or "pacing," data transmission across a RTT to reduce burstiness.

Generally, an embodiment of a process and method for TCP slow-start for Wide Area Networks, WANs, which is referred to herein as adaptive fast start (or "AFStart"), incorporates into the TCP slow-start process an inline available bandwidth measurement technique to adaptively set the slow-start threshold ssthresh and intelligently adjust the congestion window (cwnd). Embodiments can also be applied to network access and network transport, such as multimedia transport, data transport, video transport, file transport, and the like.

The performance of AFStart was evaluated through simulations using the dumb-bell topology and the parking-lot topology by applying AFStart to Fast TCP, which is a commercial adaptation of TCP that uses queuing delay instead of loss probability as a congestion signal. AFStart simulation results show that AFStart can ramp up the congestion window from its initial value to the slow-start threshold more quickly and smoothly than standard slow-start, and that AFStart achieves higher network link utilization and TCP throughput during slow-start than Fast TCP.

An embodiment of the AFStart TCP slow-start process for WANs incorporates an inline available bandwidth probing process into the TCP slow-start process, referred to herein as inline measurement TCP ("ImTCP"). The slow-start threshold ssthresh is adaptively set with the measured available bandwidth. AFStart provides an efficient way to grow the congestion window from its initial value to the slow-start threshold ssthresh quickly and smoothly. AFStart can also incorporate TCP pacing to fill smoothly the link pipe between the sender and the receiver.

Turning now to FIG. 1, illustrated is a flow chart of the adaptive fast-start process AFStart, in accordance with an embodiment. Adaptive process AFStart may be implemented, for example, by end systems such as, but not limited to, servers, user terminals, handsets, smartphones, personal computers, and laptops. Alternatively, other systems may implement AFStart. Initially, in block or step 105 the congestion window (e.g. cwnd) is set to an initial number of packets to be sent, such as four packets. The initial packets are sent to provide an initial estimate of the available bandwidth by a process in block or step 110. To initially estimate the available bandwidth, the packets may be sent back to back. The available bandwidth is estimated based on the total sizes of the packets sent and the delay dispersion of the acknowledgment (ACK) packets sent back from the receiver. Various techniques to estimate available bandwidth from ACK delays are known to one skilled in the art. The initial estimate of the available bandwidth is generally a rough estimate, and may not be very accurate with a four-packet, one-time only estimate. Nonetheless, it can provide a sufficient reference for whether or not to continue the adaptive fast slow-start process.

Based on the initial available bandwidth estimate, the congestion window (e.g. cwnd) may be adjusted. For example, based on the initial available bandwidth estimate, e.g. in block or step 115, if the calculated available bandwidth estimate (which may be scaled as necessary for consistency of units) is larger than a predefined number of packets, e.g., larger than 16 packets, the adaptive fast-start process continues in block or step 116 wherein the congestion window (e.g. cwnd) is set to the larger number of packets, e.g., 16 packets.

In accordance with another embodiment, the available bandwidth is re-estimated, and the slow-start threshold (e.g. ssthresh) is set to the re-estimated available bandwidth. In an example implementation, for example in block or step 120, the packets of the adjusted congestion window (e.g. cwnd) are further sent and the available bandwidth is re-estimated by a bandwidth estimating process using subranges, e.g., using the inline measurement TCP ("ImTCP") bandwidth estimating process with subranges. For example, if 16 packets are sent, they are divided into four groups of four packets. The first group is sent assuming a lower available bandwidth, and each successive group is sent assuming a higher available bandwidth. If the congestion window (e.g. cwnd) is large enough to permit eight packets for each of the four subranges (e.g., 32 in this specific example), then eight packets can be used as bandwidth probes for each subrange. In an embodiment, the acknowledgement (ACKs) delay trends for each group are examined to determine how well the communication link between the sender and receiver supports the assumed bandwidth. In addition, embodiments consider that the ACK delay trends of the successive groups are employed to provide a refined estimate of the available bandwidth. In block or step 115, if the calculated available bandwidth estimate is not large enough to permit the packets to be send (e.g., less than 32 for this specific example), then in block or step 117 the process switches to normal slow-start and ends in block or step 155.

After executing block or step 120, in block or step 125 the slow-start threshold ssthresh is set to the re-estimated available bandwidth produced in step or block 120. The re-estimated available bandwidth may be rescaled so as to provide dimensional consistency with the slow-start threshold ssthresh. For example, the packet size can be different for different communication media between the sender and receiver. Example packet sizes are about 1.5 and 4 kb.

Still other example embodiments determine whether the measured available bandwidth is stable. In an example, the determination process can be implemented in block or step 126, a standard deviation (i.e. a statistical measure) of the re-estimated available bandwidth may be calculated, which will be employed to assess the stability/accuracy of the re-estimated available bandwidth. In an alternative embodiment, a different statistical measure can be employed to assess the stability and/or accuracy of the re-estimated available bandwidth.

Because ImTCP can yield an acceptable available bandwidth estimate in intervals as short as one to four RTTs, ImTCP can be integrated into TCP slow-start to set the slow-start threshold ssthresh intelligently without degrading TCP data transmission performance.

If the standard deviation of the measured available bandwidth is smaller than a predefined threshold, such as 0.2 times the measured available bandwidth, as determined by block or step 130, the measured available bandwidth can be deemed stable.

Still another example embodiment further adjusts the congestion window according to the determination result, for example, if the measured available bandwidth is stable, whereupon the congestion window (e.g. cwnd) is set to ssthresh in block or step 135. Otherwise, the measured available bandwidth is unstable and the congestion window size is updated with a fraction (e.g. a half) of the difference between slow-start threshold (e.g. ssthresh) and congestion window (e.g. cwnd), e.g., an average of cwnd and ssthresh, as performed in block or step 140:

$$cwnd = cwnd + (ssthresh - cwnd)/2$$
$$= (ssthresh + cwnd)/2.$$

In an alternative embodiment, the congestion window size is updated with a different fraction, such as 0.3, of the difference between ssthresh and cwnd.

Still, other embodiments further adjust the congestion window if a predetermined time lapses from starting the TCP slow-start process is reached. For instance, if the time lapsed from starting the TCP slow-start process is less than, for example, six RTTs, then the process may return to block or step 120. Otherwise, the process may continue in block or step 150, where the congestion window (e.g. cwnd) is set to the slow-start threshold ssthresh, and the process switches from soft start to congestion avoidance. The process may then end in block or step 155

Figure 2:
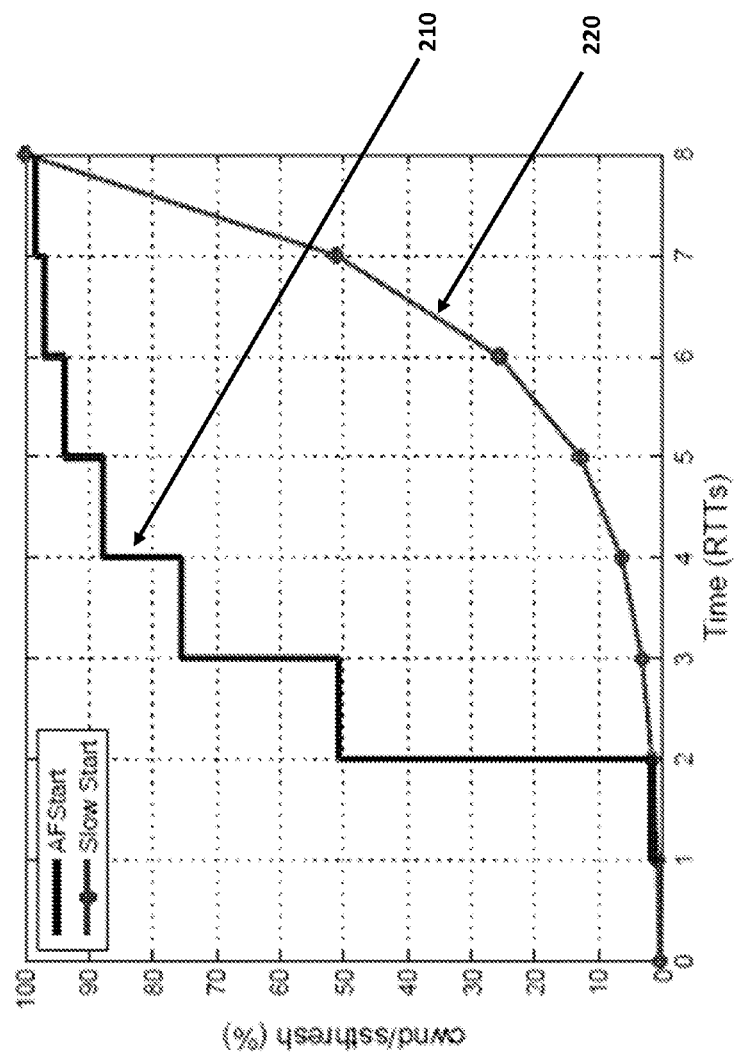
FIG. 2 shows a graph of an example comparison of congestion window ramp up for an adaptive fast start process in accordance with example embodiments described herein for TCP with that of a conventional slow-start processes.

Turning now to FIG. 2, illustrated is a graph that compares congestion window ramp up for the adaptive fast start process introduced herein for TCP with that of a conventional slow-start process. The horizontal axis of FIG. 2 represents time in RTTs, and the vertical axis represents the ratio of cwnd to ssthresh as a percentage. The congestion window cwnd is increased by half of the difference between ssthresh and cwnd, represented by block or step 140 in FIG. 1. FIG. 2 illustrates with the stepped line 210 that, with only six rounds of RTT time, the congestion window cwnd can ramp up from its initial value to more than 90% of ssthresh. After six rounds of RTT time, TCP sets the congestion window to ssthresh and switches to the congestion avoidance phase. As a comparison, the congestion window update with standard slow-start is also shown with the broken line 220 in FIG. 2 with ssthresh set to 1000 packets. From this comparison, it is evident that the standard slow-start process increases the congestion window much more aggressively than AFStart as it approaches ssthresh, while AFStart ramps up the congestion window faster than standard slow-start exponential growth at the beginning of the TCP connection. Thus, AFStart can ramp up the congestion window very quickly from the very beginning of the connection to improve TCP throughput performance during slow-start, and avoid the congestion window overshooting problem when the congestion window approaches its equilibrium point by decreasing the congestion window increment.

In an embodiment, in order to smooth TCP behavior during slow-start, TCP pacing is applied to all packets except the probe packets used for ImTCP. Within each RTT interval, ImTCP probe packets are transmitted first, and then the other packets are transmitted with even spacing across the remaining time interval if more packets can be transmitted.

Figure 3:
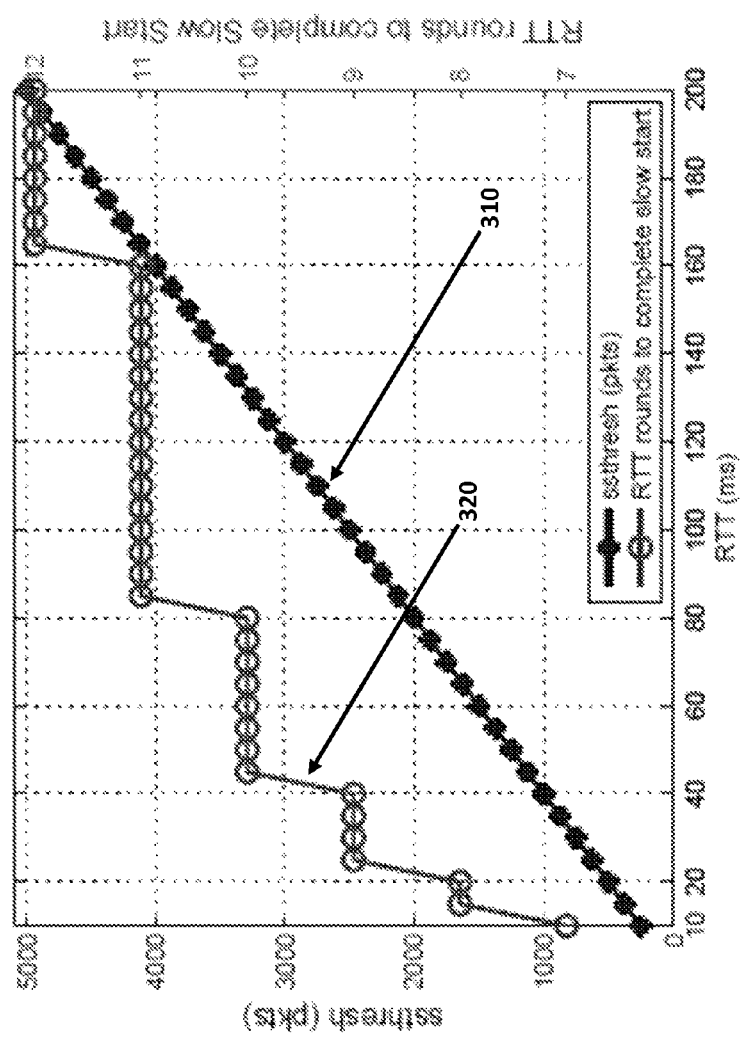
FIG. 3 shows a graph of an example comparison of a round-trip time ("RTT") rounds to complete slow-start with the standard slow-start process.

Referring now to FIG. 3, illustrated is a graph showing round-trip time ("RTT") rounds to complete slow-start with the standard slow-start process. With the standard slow-start process, the slow-start threshold parameter ssthresh is set up initially. The initial value of ssthresh may be larger than the bandwidth-delay product BDP, causing TCP flows to suffer from temporary queue overflow and multiple packet losses, or it may be smaller than BDP, causing TCP flows to switch prematurely to the congestion avoidance phase. With standard slow-start, TCP flows take $N_{ss}$=floor[$\log_2$ (ssthresh)] rounds of RTT time to complete the slow-start phase. Keeping a consistent available bandwidth of 200 Mbps and assuming that the initial ssthresh is set to BDP, FIG. 3 shows with line 310 the relationships between the RTT time and the slow-start threshold parameter ssthresh, and with broken line 320 the relationship between the RTT time and the required rounds of RTT time to complete the slow-start stage with the standard slow-start process when the initial value of cwnd is set to 4. With the increase of RTT from 10 ms to 200 ms, the slow-start threshold parameter ssthresh increases linearly and the required number of rounds of RTT time to complete the slow-start stage increases almost log-linearly. However, with the adaptive fast slow-start process introduced herein, a constant NAF=6 rounds of RTT time is required to increase the congestion window to more than 90% of the value of ssthresh.

Figure 4:
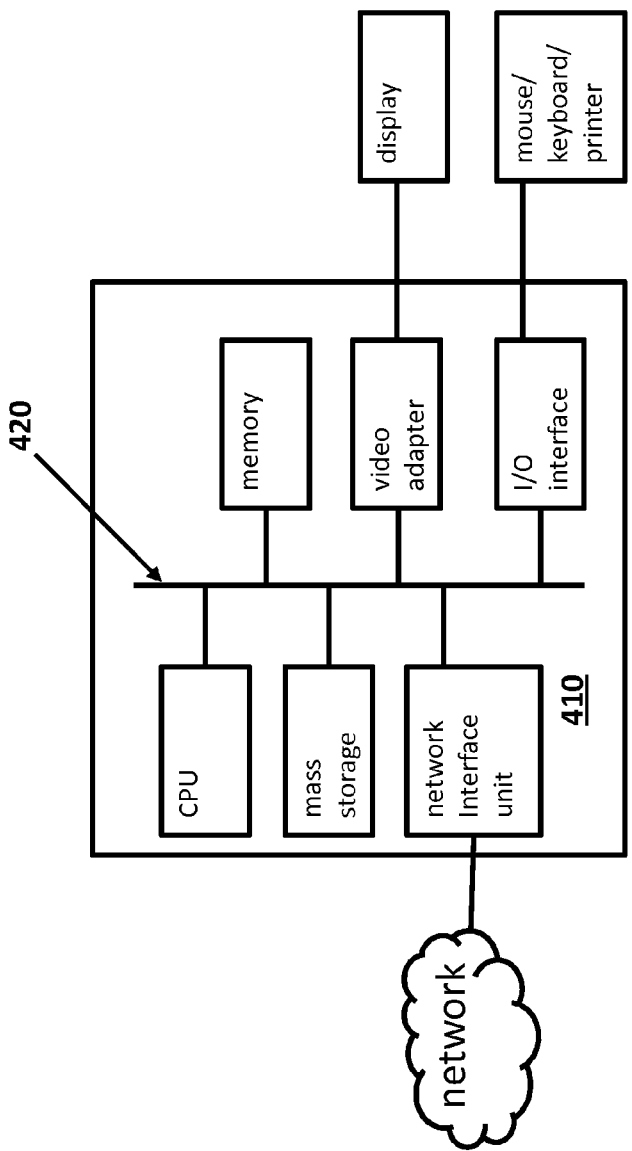
FIG. 4 illustrates a block diagram of a computing platform that may be used for implementing, for example, the adaptive fast start process in accordance with example embodiments described herein.

FIG. 4 illustrates a block diagram of a processing system that can be used for implementing the methods and processes disclosed herein, such as the adaptive fast start process. The processing system may include a processor 410 that may be equipped with one or more input/output devices, such as a mouse, a keyboard, printer, or the like, and a display. The processor 410 may include a central processing unit (CPU), memory, a mass storage device, a video adapter, and an I/O interface connected to a bus 420. The CPU operating in conjunction with the memory and other processing system elements is configured, with an operating system, to execute applications in the processing system.

The bus 420 may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for data storage for use while executing programs.

The mass storage device may comprise any type of storage device configured to store data, programs, and other information and to make the data, programs, and other information accessible via the bus. The mass storage device may comprise, for example, one or more of a hard disk drive, a magnetic disk drive, an optical disk drive, or the like.

The video adapter and the I/O interface provide interfaces to couple external input and output devices to the processing unit. As illustrated in FIG. 4, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processor also includes a network interface unit, which may be a wired link, such as an Ethernet cable or the like, and/or a wireless link. The network interface unit allows the processing unit to communicate with remote units via the network. In an embodiment, the processing unit is coupled to a local-area network or a wide-area network to provide data processing and communications to remote devices, such as other processing units, the Internet, remote storage facilities, or the like.

It should be noted that the processing system may include other components. For example, the processing system may include power supplies, cables, a motherboard, removable storage media, cases, and the like. These other components, although not shown, are considered part of the processing system.

Embodiments such as those presented herein provide a system and a method to operate a slow-start phase of a transmission control protocol system. An embodiment method includes initializing cwnd, sending cwnd packets, estimating an available bandwidth for the cwnd packets, setting cwnd to a higher number, sending the higher number of further packets if the available bandwidth is greater than a first threshold level, re-estimating the available bandwidth for the higher number of the further packets, and setting ssthresh to the re-estimated available bandwidth. In an embodiment, the first threshold level is 16 packets per RTT. In an embodiment, the higher number is 16. In an embodiment, the method further includes calculating a statistical measure for the re-estimated available bandwidth, and setting cwnd equal to ssthresh if a ratio of the statistical measure to the re-estimated available bandwidth is less than a second threshold level. In an embodiment, the statistical measure is a standard deviation of the re-estimated available bandwidth and the second threshold level is 0.2. In an embodiment, the method further includes setting cwnd to an average of ssthresh and cwnd if the ratio of the statistical measure to the re-estimated available bandwidth is at least the second threshold level. In an embodiment, the method further includes setting the congestion window cwnd equal to the slow-start threshold ssthresh if an elapsed time is greater than a number of RTTs, and transitioning the slow-start phase to a congestion avoidance phase if the elapsed time is greater than the number of RTTs. In an embodiment, the number of RTTs is six. In an embodiment, cwnd is initialized to four. In an embodiment, delay dispersion of acknowledgment packets sent back from a receiver is employed for estimating the available bandwidth.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

We claim:

1. A method of operating a an adaptive fast (AF) time slow-start phase of a transmission control protocol system, the method comprising:
   initializing a congestion window (cwnd) in the AF time slow-start phase, the cwnd is equal to a number of packets less than a first threshold corresponding to a number of packets designated per round trip time (RTT);
   sending a quantity of cwnd packets;
   performing, for an initial RTT, a first estimation of available bandwidth for the quantity of cwnd packets, wherein the first estimation is based on evaluating per RTT a delay of acknowledgement from a receiver in response to sending the quantity of cwnd packets;
   determining the available bandwidth for the cwnd packets is greater than a first threshold level;
   in accordance with determining the available bandwidth is greater than the first threshold level, adjusting the cwnd to a higher number of packets;
   sending a quantity of adjusted cwnd packets;
   repeating per each next RTT during the AF time slow-start phase and until an elapsed time is greater than a number of RTTs, performing a second estimation of available bandwidth, wherein the second estimation per each next RTT is based on dividing the quantity of adjusted cwnd packets into a plurality of successive subranges of packets, sending the packets in each successive subrange assuming a higher bandwidth, and evaluating the available bandwidth by considering delay of acknowledgement for each one of the subranges;
   setting a slow-start threshold (ssthresh) to the available bandwidth obtained by the second estimation; and
   adjusting the cwnd based on the ssthresh.

2. The method as recited in claim 1 wherein the first threshold level is 16 packets per RTT.

3. The method as recited in claim 1 wherein the higher number is 16.

4. The method as recited in claim 1, wherein adjusting the cwnd based on the ssthresh includes:
   calculating a statistical measure for the available bandwidth obtained by the second estimation; and
   setting the cwnd equal to the ssthresh when a ratio of the statistical measure to the available bandwidth is less than a second threshold level.

5. The method as recited in claim 4 wherein the statistical measure is a standard deviation of the available bandwidth and the second threshold level is 0.2.

6. The method as recited in claim 4, wherein adjusting the cwnd based on the ssthresh includes setting the cwnd to an average of the ssthresh and the cwnd when the ratio of the statistical measure to the available bandwidth is at least the second threshold level.

7. The method as recited in claim 1, further comprising:
   setting the cwnd equal to the ssthresh when the elapsed time is greater than the number of RTTs; and
   transitioning the AF time slow-start phase to a congestion avoidance phase when the elapsed time is greater than the number of RTTs.

8. The method as recited in claim 7 wherein the number of RTTs is six.

9. The method as recited in claim 1, wherein the cwnd is initialized to four.

10. The method as recited in claim 1, wherein the first estimation considers delay dispersion of acknowledgment packets sent back from the receiver.

11. The method of claim 1, wherein performing the second estimation per RTT increases the cwnd in the AF time slow-start phase at a faster rate in comparison to a conventional slow-start phase performing per round trip time the first estimation per RTT without using the second estimation.

12. The method of claim 1, wherein performing the second estimation per RTT increases the cwnd to the ssthresh ratio in the AF time slow-start phase in step-wise increments over a range of RTTs.

13. A system comprising:
    a central processing unit configured to execute a software application program; and
    a network interface unit configured to
       initialize a congestion window (cwnd) to communicate data produced by the software application program in packets in a slow-start phase to a remote system;
       send a quantity of cwnd packets;
    perform, for an initial round tri time RTT, a first estimation of available bandwidth for the quantity of cwnd packets, wherein the first estimation is based on evaluating per RTT a delay of acknowledgement from a receiver in response to sending the quantity of cwnd packets;
       determine the available bandwidth for the cwnd packets is greater than a first threshold level;
       in accordance with determining the available bandwidth is greater than a first threshold level, adjust the cwnd to a higher number of packets;
       send a quantity of adjusted cwnd packets;
    repeat per each next RTT during the AF time slow-start phase and until an elapsed time is greater than a number of RTTs, performing a second estimation of available bandwidth, wherein the second estimation per each next RTT is based on dividing the quantity of adjusted cwnd packets into a plurality of successive subranges of packets, sending the packets in each successive subrange assuming a higher bandwidth, and evaluating the available bandwidth by considering delay of acknowledgment for each one of the subranges;
       set a slow-start threshold (ssthresh) to the available bandwidth obtained by the second estimation; and
       adjust the cwnd based on the ssthresh.

14. The system as recited in claim 13, wherein the first threshold level is 16 packets per RTT.

15. The system as recited in claim 13, wherein the higher number is 16.

16. The system as recited in claim 13, wherein to adjust the cwnd based on the ssthresh, the network interface unit is configured to:
 calculate a statistical measure for the available bandwidth obtained by the second estimation, and
 set the cwnd equal to the ssthresh when a ratio of the statistical measure to the available bandwidth is less than a second threshold level.

17. The system as recited in claim 16, wherein the statistical measure is a standard deviation of the available bandwidth and the second threshold level is 0.2.

18. The system as recited in claim 16, wherein to adjust the cwnd based on the ssthresh, the network interface unit is configured to:
 set the cwnd to an average of ssthresh and cwnd when the ratio of the statistical measure to the available bandwidth is at least the second threshold level.

19. The system as recited in claim 13, wherein the network interface unit is configured to set the cwnd equal to the ssthresh when the elapsed time is greater than the number of RTTs, and
 transition the slow-start phase to a congestion avoidance phase when the elapsed time is greater than the number of RTTs.

20. The system as recited in claim 19, wherein the number of RTTs is six.

21. The system as recited in claim 13, wherein the cwnd is initialized to four.

22. The system as recited in claim 13, wherein the first estimation employs delay dispersion of acknowledgment packets sent back from the receiver.

* * * * *